US007334689B2

(12) United States Patent
Galvin et al.

(10) Patent No.: US 7,334,689 B2
(45) Date of Patent: Feb. 26, 2008

(54) OVERFLOW LAUNDER

(75) Inventors: Kevin Galvin, Callaghan (AU); Maurice Munro, Banyo (AU)

(73) Assignee: The University of Newcastle Research Associates Limited (AU)

( * ) Notice: Subject to any disclaimer, the term of this patent is extended or adjusted under 35 U.S.C. 154(b) by 7 days.

(21) Appl. No.: 10/552,016

(22) PCT Filed: Apr. 5, 2004

(86) PCT No.: PCT/AU2004/000444

§ 371 (c)(1), (2), (4) Date: Oct. 3, 2005

(87) PCT Pub. No.: WO2004/087326

PCT Pub. Date: Oct. 14, 2004

(65) Prior Publication Data

US 2006/0201875 A1 Sep. 14, 2006

(30) Foreign Application Priority Data

Apr. 4, 2003 (AU) .............................. 2003901615

(51) Int. Cl.
*B01D 21/24* (2006.01)

(52) U.S. Cl. ...................... 210/521; 210/522; 210/540; 210/532.1

(58) Field of Classification Search ................ 210/521, 210/526, 527, 540, 532.1, 522
See application file for complete search history.

(56) References Cited

U.S. PATENT DOCUMENTS 2,291,733 A * 8/1942 Lemmen ..................... 210/526
2,509,933 A * 5/1950 Lind .......................... 210/526
2,635,758 A * 4/1953 Walker ....................... 210/526
2,708,520 A * 5/1955 Dallas ........................ 210/526
3,489,287 A * 1/1970 Streander .................... 210/526
3,774,770 A * 11/1973 Sparham et al. ............ 210/527
3,886,064 A * 5/1975 Kosonen ..................... 210/522
4,089,782 A * 5/1978 Huebner ..................... 210/522
4,156,644 A * 5/1979 Richard ...................... 210/521
4,595,504 A * 6/1986 Hellman et al. ............ 210/521
4,793,926 A * 12/1988 Vion .......................... 210/521
4,889,624 A * 12/1989 Soriente et al. ............. 210/522
4,957,628 A * 9/1990 Schulz ....................... 210/521
5,611,917 A 3/1997 Degner
6,245,243 B1 * 6/2001 Meurer ....................... 210/540
2003/0127379 A1 * 7/2003 De Bruijn et al. .......... 210/521
2003/0234227 A1 12/2003 Niitti

* cited by examiner

*Primary Examiner*—Christopher Upton
(74) *Attorney, Agent, or Firm*—Ostrolenk, Faber, Gerb & Soffen, LLP

(57) ABSTRACT

An overflow launder for a separation cell where particles are fluidiZEd and rise to the top of the cell, has a primary trough (1) surrounding the rim of the cell (2), and an array of secondary troughs (4) extending across the fluid surface from the side (5) of the rim to the opposite side (6). FluidiZed particles can report directly to the secondary troughs (4) without travelling across the surface of the cell, reducing the incidence configurations with radial secondary troughs and external and/or internal primary troughs are also described.

9 Claims, 5 Drawing Sheets

OVERFLOW LAUNDER

CROSS REFERENCE TO RELATED APPLICATION

The present application is a 35 U.S.C. § 371 national phase conversion of PCT/AU2004/000444 filed 5 Apr. 2004, which claims priority of Australian Application No. 2003/901615 filed 4 Apr. 2003.

FIELD OF THE INVENTION

The present invention relates to overflow launders. It has been developed primarily as a device for collecting overflow from a separation cell and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known overflow launders include catchment troughs which surround the outer perimeter of a separation cell. A separation cell is typically a device for separating particles via the use of a fluid or which is typically a liquid but which may be a gas. The precise basis of the separation is not important. In flotation processes, the separation may be achieved via the attachment of hydrophobic particles to rising air bubbles. In a fluidised bed classifier the separation may arise through the entrainment of slower settling particles with the upward flowing fluid, and in thickening the separation is achieved by ensuring that virtually all of the solid particles segregate from the upward fluid flow. The fluid and any entrained particles or bubbles, for example, then overflows into the trough or launder.

A disadvantage of having the catchment trough around the perimeter of the cell is that particles entrained by the upward flowing fluid must travel laterally with a substantial horizontal motion near the surface of the vessel in order to reach the rim of the separation cell, unless of course they originate from a location near the vessel perimeter. It is during this substantially horizontal motion near the surface of the vessel that there is a possibility that a particle may separate from the overflow and fall back towards the base of the cell. This is inefficient as the particle must again undergo a separation process so that it can finally reach the rim.

In some vessels an internal launder is also provided, typically in the form of an inner annulus or trough, but upwardly flowing fluid must still travel laterally a significant distance with a substantially horizontal motion near the surface of the vessel in order to reach either the internal launder, or the outer trough.

Further disadvantages occur when using overflow launders with a reflux classifier, which is a separate cell that includes a series of inclined parallel plates that allow particular particles to rise to the surface, which may depend on the properties of the particles such as their size or density. When using the above overflow launder in conjunction with the reflux classifier, there can be a tendency for particles to become segregated from the overflow, and hence a tendency for these particles to re-enter the inclined channels at a position closer to the overflow perimeter. This may produce a downward flow in an included channel or even a blockage. A downward flow is associated with internal interactions between different channels. This internal flow circulation may produce higher upward flows in some channels, and downward flows in other channels, or even upward or downward flows in the same channel. This interaction may then produce a poorer quality separation.

It is an objective of the present invention to overcome or ameliorate at least one or more of the disadvantages of the prior art, or at least to provide a useful alternative.

DISCLOSURE OF THE INVENTION

According to the invention there is provided an overflow launder for a separation cell of the type wherein particles rise to the surface of the fluid in the cell and overflow into the launder, including:

one or more primary troughs located adjacent the surface of the fluid in the cell in use; and one or more secondary troughs extending in use across an upper portion of the fluid in the cell such that fluid containing particles overflows into the secondary troughs and drains along these troughs into one or more said primary troughs.

The particles can be solid, liquid, or gaseous.

Preferably, the overflow launder includes an array of said secondary troughs extending across the fluid surface.

Preferably, each secondary trough has at least one elongate lip over which the particles overflow into the trough, the lips of each trough being substantially level with each other.

Preferably, each secondary trough has two said lips extending along opposite edges of the trough.

Preferably, one or more said secondary troughs extends across the cell from a primary trough on one side of the cell to a primary trough on the opposite side of the cell, such that in use fluid can drain from either end of said secondary trough into the primary trough.

Preferably, said secondary troughs include a raised internal portion at an intermediate position in the trough, causing fluid to drain to each end of the trough and into the primary trough.

Preferably, the secondary troughs are spaced to permit overflow to rise up between the troughs and over said elongate lip.

Preferably, the secondary troughs are channels which are "v" shaped in cross-section.

Preferably, each of said "v" shaped channels includes a false floor extending along said channel, the false floor being relatively higher in the centre region of said channel, forming said raised internal portion, and relatively lower toward each end of the trough.

Preferably, the lips of each of the said "v" shaped channels comprising the said secondary troughs intersect the inclined plates in a Reflux Classifier or other inclined or vertical plate device. The inclined or vertical plates extend to a higher elevation than the lips of the secondary troughs, forcing all fluid and particles to report directly to the said secondary troughs. The said intersection produces independent outlets for the fluid and its associated particles, thus preventing flow interactions between different sections of the vessel, and also greatly reducing the horizontal distances along which the fluid and associated particles must travel.

Preferably, the primary trough includes an outlet for passing the fluid and liquid particles out of the overflow launder.

Preferably, the primary trough surrounds the outer perimeter of the separation cell.

Preferably, the overflow launder is suitable for collecting overflow from a reflux classifier.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
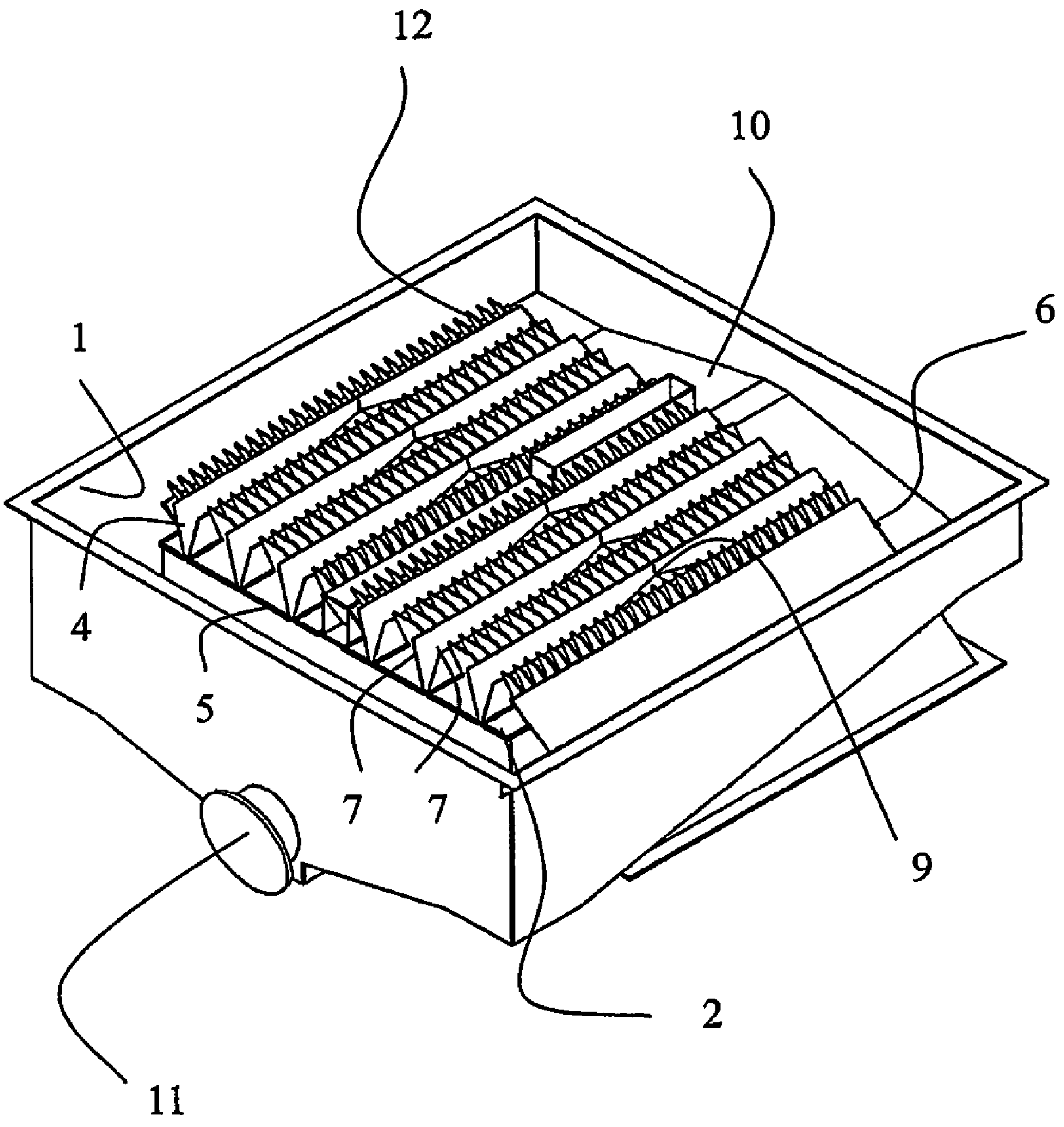
FIG. 1 is an isometric view of an overflow launder according to the invention, shown in use with the upper part of a reflux classifier.
Figure 2:
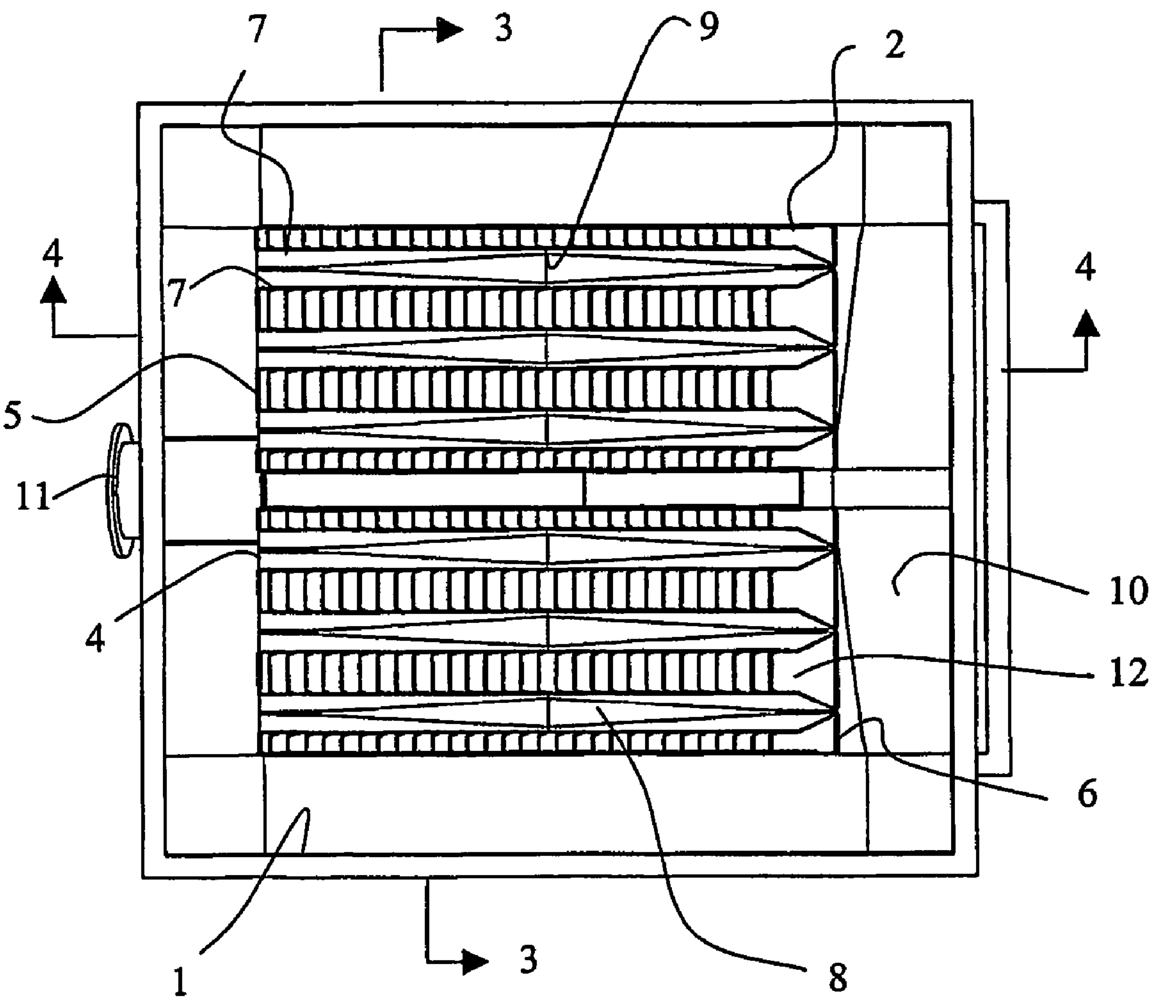
FIG. 2 is a top view of the overflow launder, shown in FIG. 1.

Referring to the drawings, the overflow launder includes a primary trough 1 surrounding the upper rim 2 of a reflux classifier having an upper set of plates 12. An array of secondary troughs 4 extend across the fluid surface of the reflux classifier from one side 5 of the rim to the opposite side 6 of the rim. This allows fluid to drain from either end of each secondary trough into the primary trough.

Figure 3:
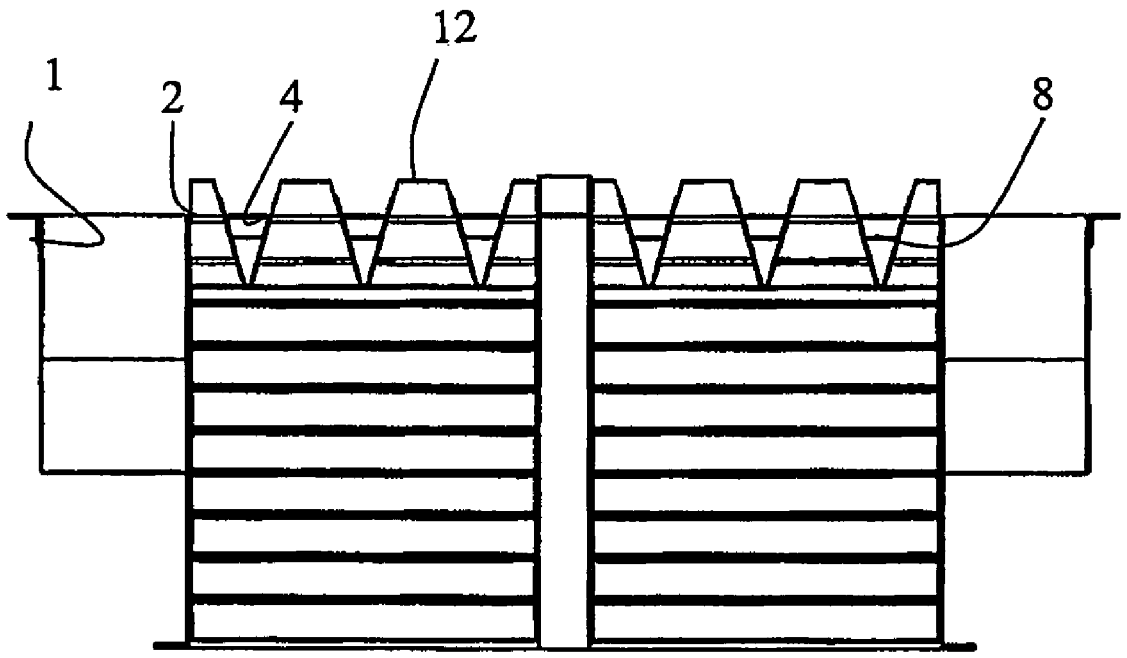
FIG. 3 is sectional view of the overflow launder taken on line 3-3 of FIG. 2.
Figure 4:
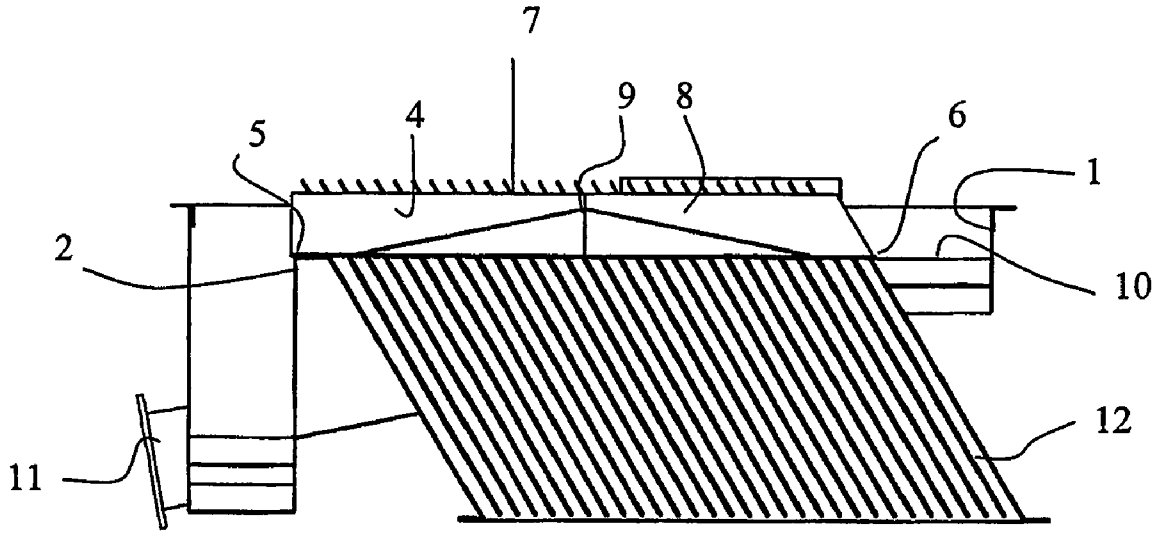
FIG. 4 is sectional view of the overflow launder taken on line 4-4 of FIG. 2.

The secondary troughs include a pair of elongate lips 7 forming overflow weirs into the trough 4. The lips of each secondary trough are substantially level, as seen in FIG. 3.

The secondary troughs are channels that are "v" shaped in cross section. They include a false floor 8 that extends along the channel. The false floor is relatively higher in the centre region 9 of the channel and relatively lower toward each end of the channel. This forms a raised internal portion at an intermediate position in the trough, and relatively lower portions toward each end of the trough, as best seen in FIG. 1.

The secondary troughs are also spaced apart to permit overflow to rise up between the troughs and over the elongate lips 7.

The primary trough includes one side 10 that is elevated higher than that of the others to facilitate overflow drainage towards an outlet 11.

In use, a feed containing particles enters the separation cell, such as a reflux classifier. The fluid and a portion of the feed particles rises towards the top of the device. The open compartments of the upper surface are smaller in cross-sectional area than the vessel. Hence the fluid and particles must accelerate slightly to permit the fluid and particles under the "v" shaped troughs to emerge via the open compartments. This acceleration promotes higher velocities at the overflow. The overflow, which consists of fluid and particles rising between the plates 12, moves over the elongate lip 7 and flows along the false floor 8 of the secondary trough 4. It then drains into the primary trough 1 and through the outlet 11.

The overflow launder can be used for liquid fluidised beds consisting of rigid solid particles, or deformable liquid or gas based particles, and also particles that grow or shrink in size over time. Similarly with respect to the same range or particles, the device can be used for gas-fluidised systems. This would typically be done by placing a sealed lid over the vessel to force the exit gas and its entrained particles to flow into the secondary troughs. A lid over the primary trough ensures the flow passes through the primary trough to the outlet.

Figure 5:
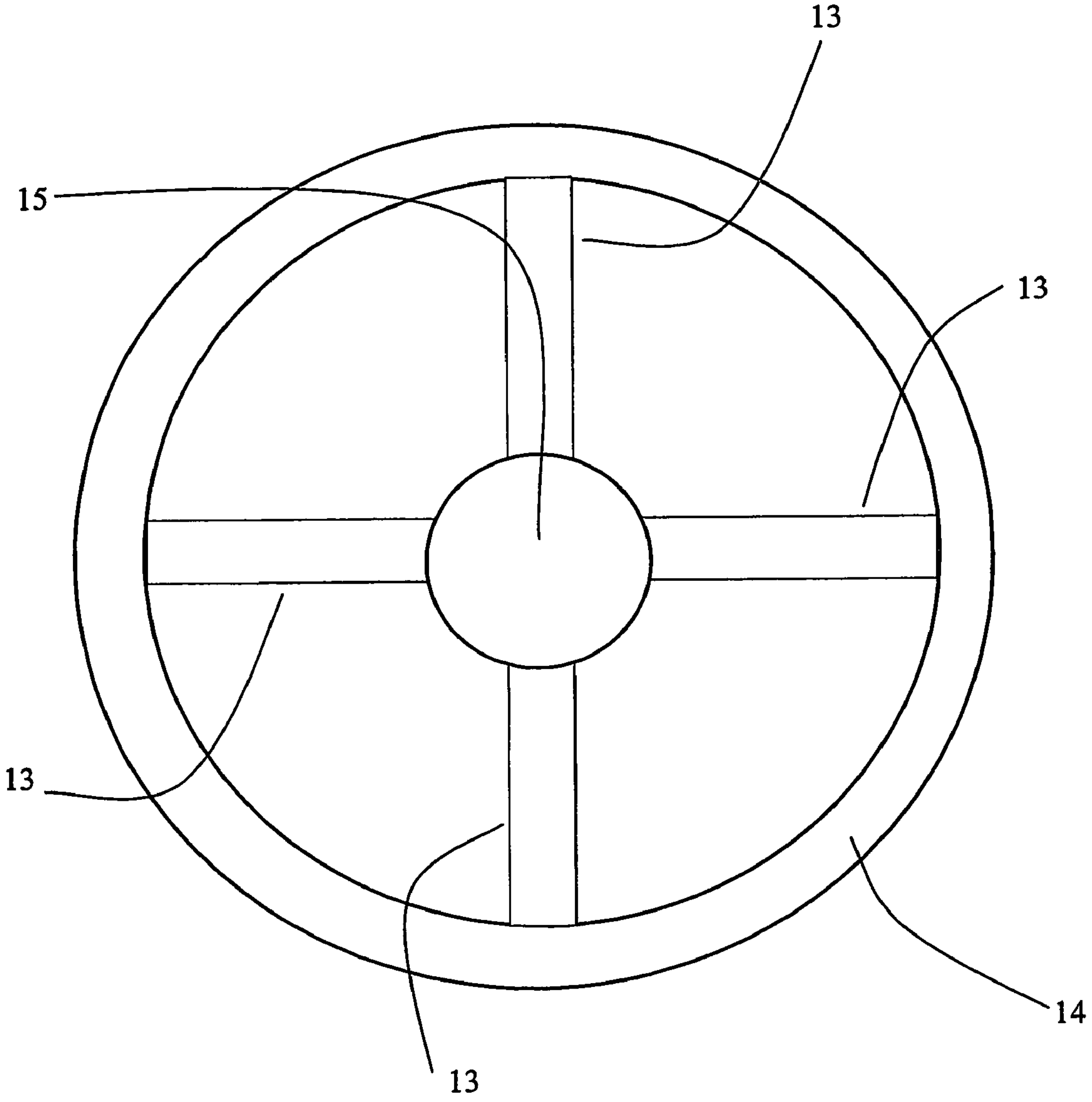
FIG. 5 is a diagrammatic top view of an alternative arrangement of overflow launder with an internal trough.

Although the primary trough has been described as surrounding the upper rim of a cell, typically a reflux classifier, it will be apparent that other cell and trough configurations could be used. For example, as shown in FIG. 5, the cell may be generally circular in cross section with the secondary troughs 13 extruding radially from a central point to a circumferential primary launder 14, or the cell may also have an internal launder 15 with the secondary troughs radiating between the internal and external launders and fluid draining from either end of each secondary trough into the internal or external launder respectively. Four secondary troughs are shown in FIG. 5, but more or less could be used as required.

In one embodiment, the central annulus 15 may be a feed well, hence overflow travels radially outwardly along the secondary troughs 13. Alternatively, the feed may enter elsewhere, and the central annulus 15 acts as an internal launder, in which case overflow travels both radially towards the centre (if in the inner region of the vessel) and radially outwardly towards the primary trough 14 (if in the outer region of the vessel). The inner annulus 15 could even be removed altogether in which case all overflow travels radially outward towards the primary trough 14.

The overflow launder is particularly suitable for use with a reflux classifier such as was described above. FIGS. 1 to 4 show the overflow launder fitted over the upper plates 12 of the reflux classifier. The upper ends of the plates 12 protrude in segments between the secondary troughs 4 to guide the overflow into the secondary troughs.

The overflow launder ensures that the overflow emerging from each part of the inclined channels does so in an independent fashion. This promotes a steady and fixed upward flow velocity through each of the inclined channels. There is no longer the prospect of a downward flow through one channel, resulting in a high upward flow through another channel, as is possible in prior art launders.

It will be appreciated that the overflow launder substantially reduces the amount of lateral or horizontal movement of the overflow, thus reducing the likelihood of flow circulation and particle drop out.

Although the invention has been described with reference to a specific example, it will be appreciated by those skilled in the art that the invention can be embodied in many other forms.

The invention claimed is:

1. An overflow launder for a separation cell of the type wherein particles rise to a surface of a fluid in the cell and overflow into the launder, including:

two or more primary troughs located adjacent to the surface of the fluid in the cell; and one or more secondary troughs extending across an upper portion of the fluid in the cell such that fluid containing particles overflows into said one or more secondary troughs and drains along said one or more secondary troughs into one or more of said two or more primary troughs, wherein one or more of said secondary troughs extend across the cell from one said primary trough on one side of said cell to a second primary trough on an opposite side of said cell, such that fluid can drain from either end of said one or more secondary troughs into one or more of said primary troughs, and each of said one or more secondary troughs includes a raised internal portion at an intermediate position in the respective said secondary trough for enabling fluid to drain to an end of the respective said secondary trough and into an adjacent said primary trough.

2. An overflow launder as claimed in claim 1, further comprising an array of said one or more secondary troughs extending across the fluid surface.

3. An overflow launder as claimed in claim 1, wherein each of said one or more secondary troughs has at least one elongate lip over which particles overflow into the respective said secondary trough, the lips of each said secondary trough being substantially level with each other.

4. An overflow launder as claimed in claim 3, wherein each of said one or more secondary troughs has two of said lips extending along opposite edges of the respective said secondary trough.

5. An overflow launder as claimed in claim 1, wherein said one or more secondary troughs comprise channels which are “v” shaped in cross-section and have a center region and opposite ends.

6. An overflow launder as claimed in claim 5, wherein at least some of said “v” shaped channels include a false floor extending along said “v” shaped channel, the false floor being relatively higher in the center region of said “v” shaped channel, forming said raised internal portion, and relatively lower toward each of the ends of the “v” shaped channel.

7. An overflow launder as claimed in claim 5, wherein each of said one or more secondary troughs has at least one elongate lip over which particles overflow into the respective said secondary trough, the lips of each said secondary trough being substantially level with each other; and said separation cell includes a series of inclined parallel plates and said lips of each of said one or more secondary troughs intersect the inclined parallel plates.

8. An overflow launder as claimed in claim 7, wherein the inclined parallel plates extend to a higher elevation than the lips of one or more of said one or more secondary troughs, forcing all fluid and particles between the inclined parallel plates to report directly to one or more of said one or more secondary troughs.

9. An overflow launder for a separation cell of the type wherein particles rise to a surface of a fluid in the cell and overflow into the launder, including:

one or more primary troughs located adjacent to the surface of the fluid in the cell; and one or more secondary troughs extending across an upper portion of the fluid in the cell such that fluid containing particles overflows into said one or more secondary troughs and drains along said one or more secondary troughs into one or more of said one or more primary troughs, wherein one or more of said secondary troughs includes a raised internal portion at an intermediate position in the respective said secondary trough for causing fluid to drain to one or more ends of the respective said secondary trough and into one or more of said primary troughs, wherein each of said secondary troughs comprises channels which are “v” shaped in cross-section and have a center region and opposinG ends, and wherein at least some of said “v” shaped channels include a false floor extending along said “v” shaped channel, said false floor being relatively higher in a center region of said “v” shaped channel, forming said raised internal portion, and relatively lower toward each end of the “v” shaped channel.

* * * * *